(12) United States Patent
Chen et al.

(10) Patent No.: US 10,387,545 B2
(45) Date of Patent: Aug. 20, 2019

(54) PROCESSING PAGE

(71) Applicant: Alibaba Group Holding Limited, Grand Cayman (KY)

(72) Inventors: Sha Chen, Hangzhou (CN); Menghui Chen, Hangzhou (CN); Honghua He, Hangzhou (CN); Zhang Liu, Hangzhou (CN); Yining Chen, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 493 days.

(21) Appl. No.: 14/549,394

(22) Filed: Nov. 20, 2014

(65) Prior Publication Data

US 2015/0143214 A1  May 21, 2015

(30) Foreign Application Priority Data

Nov. 21, 2013 (CN) .......................... 2013 1 0598660

(51) Int. Cl.
*G06F 17/22* (2006.01)
*G06F 16/951* (2019.01)

(52) U.S. Cl.
CPC ........ *G06F 17/2235* (2013.01); *G06F 16/951* (2019.01)

(58) Field of Classification Search
CPC ........... G06F 17/2235; G06F 17/30513; G06F 17/30864
See application file for complete search history.

(56) References Cited

U.S. PATENT DOCUMENTS

| | | | |
|---|---|---|---|
| 8,484,180 B2 | 7/2013 | Dmitriev et al. | |
| 2005/0071310 A1* | 3/2005 | Eiron | G06F 17/30513 |
| 2005/0076000 A1* | 4/2005 | Sweet | G06F 17/3089 |
| 2005/0192936 A1* | 9/2005 | Meek | G06F 16/951 |
| 2007/0016863 A1* | 1/2007 | Qu | G06F 17/30731 |
| | | | 715/702 |
| 2007/0078811 A1 | 4/2007 | Balasubramanian et al. | |

(Continued)

FOREIGN PATENT DOCUMENTS

| CN | 101388013 A | 3/2009 |
|---|---|---|
| CN | 102768670 A | 11/2012 |

OTHER PUBLICATIONS

Valter Crescenzi, Paolo Merialdo, and Paolo Missier, "Clustering Web pages based on their structure," copyright 2004, published by Elsevier in Data & Knowledge Engineering, vol. 54, Issue 3, Sep. 2005, pp. 279-299.*

(Continued)

*Primary Examiner* — Kavita Padmanabhan
*Assistant Examiner* — Warren Campbell, Jr.
(74) *Attorney, Agent, or Firm* — Lee & Hayes, P.C.

(57) ABSTRACT

Example methods and devices for processing a page are described. One or more pages of a designated website are acquired. The one or more pages are clustered to obtain one or more classes in accordance with page features of the pages. At least one class is selected as a list page set according to a page linking relationship between the one or more classes. It is not necessary to require an operator to manually involve in the process of establishing the list page set. The present techniques have simple operations and high accuracy rate, thereby improving an efficiency and reliability of establishing a list page library.

20 Claims, 5 Drawing Sheets

(56) References Cited

U.S. PATENT DOCUMENTS

| | | |
|---|---|---|
| 2007/0198504 A1* | 8/2007 | Feng ............... G06F 17/30864 |
| 2009/0070366 A1* | 3/2009 | Zhao ................. G06F 16/353 |
| 2009/0327237 A1 | 12/2009 | Zhang et al. |
| 2010/0211533 A1* | 8/2010 | Yang ............... G06F 17/3089 706/12 |
| 2010/0312774 A1 | 12/2010 | Dmitriev et al. |
| 2013/0144858 A1* | 6/2013 | Lin ................ G06F 17/30864 707/709 |
| 2014/0188882 A1 | 7/2014 | Wang et al. |

OTHER PUBLICATIONS

Jingyu Hou and Yanchun Zhang, "Utilizing Hyperlink Transitivity to Improve Web Page Clustering," copyright 2003, published in Proceeding ADC '03 Proceedings of the 14th Australasian database conference—vol. 17, pp. 49-57.*

Divya Padmanabhan, Prasanna Desikan, Jaideep Srivastava, and Kashif Riaz, "Wicer: A Weighted Inter-Cluster Edge Ranking for Clustered Graphs," copyright 2005, WI '05 Proceedings of the 2005 IEEE/WIC/ACM International Conference on Web Intelligence, pp. 522-528.*

Lawrence Kai Shih and David R. Karger, "Using URLs and Table Layout for Web Classification Tasks," copyright 2004, published in WWW '04 Proceedings of the 13th international conference on Wourld Wide Web, pp. 193-202. (Year: 2004).*

Meghabghab, "Discovering authorities and hubs in different topological web graph structures", Information Processing & Management, Elsevier, Barking, GB, vol. 38, No. 1, Jan. 1, 2002, pp. 111-140.

PCT Search Report and Written Opinion dated Feb. 27, 2015 for PCT Application No. PCT/US14/66704, 13 Pages.

Chinese Search Report for Application No. 201310598660X, dated Aug. 25, 2017, 1 page.

* cited by examiner

PROCESSING PAGE

CROSS REFERENCE TO RELATED PATENT APPLICATION

This application claims foreign priority to Chinese Patent Application No. 201310598660.X filed on 21 Nov. 2013, entitled "METHOD AND DEVICE FOR PROCESSING PAGE", which is hereby incorporated by reference in its entirety.

TECHNICAL FIELD

The present disclosure is related to the technology of page processing, and, more particularly, to a method and device for processing a page.

BACKGROUND

Generally, a page of a website is a webpage or webpage written based on HyperText Markup Language (HTML), Extensible HyperText Markup Language (XHTML), or Wireless Markup Language (WML). In order to collect and analyze data in pages of a website, a list page library is generally used to extract data from list pages included in the list page library according to a predetermined frequency. The existing techniques require an operator to browse each website and manually identify and label each list page of each website to create the list page library.

However, under existing techniques, the operations for creating the list page library are complicated and prone to mistakes, thereby reducing efficiency and reliability for creating the list page library.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-executable instructions as permitted by the context above and throughout the present disclosure.

The present disclosure provides an example method and device for processing a page to improve an efficiency and reliability of creating a list page library.

The present disclosure provides an example method for processing a page. One or more pages of a designated website are acquired. The one or more pages are clustered to obtain one or more classes in accordance with page features of the pages. At least one class is selected as a list page set according to a page linking relationship between the one or more classes.

For example, the step of selecting at least one class as the list page set according to the page linking relationship between the one or more classes may include the following operations. A probability of a respective page in a respective class of the website as the list page of the website is determined according to one or more other pages linked from the respective page and one or more other pages linked to the respective page. At least one class is selected as the list page set according to the probability.

For example, the probability of the respective page in the respective class of the website as the list page of the website may be determined according to other pages linked from the respective page and other pages linked to the respective page as follows.

An out-degree of a respective class is determined according to the other pages linked from each page in the respective class. An in-degree of the respective class is determined according to the other pages linked to each page in the respective class. A number of pointed classes from the respective class is determined. The respective class and each of the pointed class may satisfy that an out-degree from the respective class to a respective pointed class is larger than an in-degree from the respective class to the respective pointed class. The probability is determined according to the out-degree of the respective class, the in-degree of the respective class, and the number of pointed classes.

For example, the out-degree of the respective class is a sum of an out-degree of each page in the respective class. The out-degree of a respective page is determined by a distance between the respective page and a root node of the website, other pages linked from the respective page, and a distance between the other pages linked from the respective page and the root node of the website.

The in-degree of the respective class is a sum of an in-degree of each page in the respective class. The in-degree of the respective page is determined by the distance between the respective page and the root node of the website, other pages linked to the respective page, and a distance between the other pages linked to the respective page and the root node of the website.

For example, the step of determining the out-degree of the respective class based on other pages linked from each page in the respective class may include the following operations.

The out-degree of each class is obtained according to $$OUT_k = \sum_j \left(\sum_i DO_i\right)_j OUT_k$$

is an out-degree of a k th class and k is a natural number.

$$\left(\sum_i DO_i\right)_j$$

is an out-degree of a j th page in the k th class, j is a natural number. $DO_i$ is an out-degree increment contributed by an i th other page pointed by the j th page in a page linking relationship, and i is a natural number.

If a distance between the j th page and the root node of the website is larger than a distance between the i th page pointed by the j th page and the root node of the website, $DO_i = \alpha$. If the distance between the j th page and the root node of the website is smaller than the distance between the i th page pointed by the j th page and the root node of the website, $DO_i = \beta$. $\alpha < \beta$, $\alpha + \beta = N$, and N is a natural number. If the distance between the j th page and the root node of the website is equal to the distance between the i th page pointed by the j th page and the root node of the website, $DO_i = \chi$. $\chi = N/2$ and N is a natural number.

For example, the step of determining the in-degree of the respective class based on other pages linked to each page in the respective class may include the following operations.

The in-degree of each class is obtained according to $$IN_k = \sum_j \left(\sum_i DI_i\right)_j \cdot IN_k$$

is an in-degree of the k th class and k is a natural number;

$$\left(\sum_i DI_i\right)_j$$

is an in-degree of the j th page in the k th class, j is a natural number, $DI_i$ is an in-degree increment contributed by a i th page that points to the j th page in the page linking relationship, and i is a natural number.

If the distance between the j th page and the root node of the website is larger than the distance between the i th page that points to the j th page and the root node of the website, $DI_i=\alpha$. If the distance between the j th page and the root node of the website is smaller than the distance between the i th page that points to the j th page and the root node of the website, $DI_i=\beta$, $\alpha>\beta$, $\alpha+\beta=N$, and N is a natural number. If the distance between the j th page and the root node of the website is equal to the distance between the i th page that points to the j th page and the root node of the website, $DI_i=\chi$, $\chi=N/2$, and N is a natural number.

For example, the step of determining the probability according to the out-degree of the respective class, the in-degree of the respective class, and the number of the pointed classes may include the following operations.

The probability of each class is obtained according to $$P_k = \delta \times \frac{OUT_k}{IN_k} \times \frac{IO}{N-1},$$

$P_k$ is a probability of the k th class.

$IN_k$ is the in-degree of the k th class and k is a natural number. $OUT_k$ is the out-degree of the k th class and k is a natural number.

IO is the number of pointed classes from the k th class.

N is the total class number of the classes.

δ is a weight coefficient.

For example, an example method may further include the following operations. The list page set is used to conduct model training to create a list page identification model.

For example, after the list page set is used to conduct model training to create the list page identification model, the example method may further include the following operations. The list page identification model is used to identify a particular page. If the particular page is identified as a list page, the particular page is added into the list page set.

For example, an example method may further include the following operations. According to updating information of each list page in the list page set, the list page set is updated, an extracting frequency of each list page is adjusted, or a page template is generated.

For example, the page feature may include at least one of the following information: a layout feature of the page, a uniform resource locator of the page, and a content feature of the page.

The present disclosure also provides an example device for processing a page. The example device may include an acquiring unit, a clustering unit, and a selecting unit. The acquiring unit acquires one or more pages of a designated website. The clustering unit clusters the one or more pages to obtain one or more classes in accordance with page features of the pages. The selecting unit selects at least one class as a list page set according to a page linking relationship between the one or more classes.

For example, the selecting unit may determine a probability of a respective page in a respective class of the website as the list page of the website according to one or more other pages linked from the respective page and one or more other pages linked to the respective page and select at least one class is selected as the list page set according to the probability.

For example, the selecting unit may determine an out-degree of the respective class according to other pages linked from each page in the respective class. The selecting unit may determine an in-degree of the respective class according to the other pages linked to each page in the respective class. The selecting unit may determine a number of pointed classes from the respective class. The respective class and each of the pointed class may satisfy that an out-degree of the respective class with respect to a respective pointed class is larger than an in-degree of the respective class with respect to the respective pointed class. The selecting unit may also determine the probability according to the out-degree of the respective class, the in-degree of the respective class, and the number of pointed classes.

For example, the selecting unit may determine that the out-degree of the respective class is a sum of an out-degree of each page in the respective class. The out-degree of a respective page is determined by a distance between the respective page and a root node of the website, other pages linked from the respective page, and a distance between the other pages linked from the respective page and the root node of the website.

The selecting unit may also determine that the in-degree of the respective class is a sum of an in-degree of each page in the respective class. The in-degree of the respective page is determined by the distance between the respective page and the root node of the website, other pages linked to the respective page, and a distance between the other pages linked to the respective page and the root node of the website.

For example, the selecting unit may determine the out-degree of each class according to $$OUT_k = \sum_j \left(\sum_i DO_i\right)_j$$

$OUT_k$ is an out-degree of a k th class and k is a natural number.

$$\left(\sum_i DO_i\right)_j$$

is an out-degree of a j th page in the k th class, j is a natural number. $DO_i$ is an out-degree increment contributed by an i th other page pointed by the j th page in a page linking relationship, and i is a natural number.

If a distance between the j th page and the root node of the website is larger than a distance between the i th page pointed by the j th page and the root node of the website, $DO_i=\alpha$. If the distance between the j th page and the root node of the website is smaller than the distance between the i th page pointed by the j th page and the root node of the website, $DO_i=\beta$. $\alpha<\beta$, $\alpha+\beta=N$, and N is a natural number. If the distance between the j th page and the root node of the website is equal to the distance between the i th other page pointed by the j th page and the root node of the website, $DO_i=\chi$. $\chi=N/2$ and N is a natural number.

For example, the selecting unit may determine the in-degree of each class according to $$IN_k = \sum_j \left( \sum_i DI_i \right)_j \cdot IN_k$$

is an in-degree of the k th class and k is a natural number;

$$\left( \sum_i DI_i \right)_j$$

is an in-degree of the j th page in the k th class, j is a natural number, $DI_i$ is an in-degree increment contributed by the i th page that points to the j th page in the page linking relationship, and i is a natural number.

If the distance between the j th page and the root node of the website is larger than the distance between the i th page that points to the j th page and the root node of the website, $DI_i=\alpha$. If the distance between the j th page and the root node of the website is smaller than the distance between the i th page that points to the j th page and the root node of the website, $DI_i=\beta$, $\alpha>\beta$, $\alpha+\beta=N$, and N is a natural number. If the distance between the j th page and the root node of the website is equal to the distance between the i th page that points to the j th page and the root node of the website, $DI_i=\chi$, $\chi=N/2$, and N is a natural number.

For example, the selecting unit may obtain the probability of each class according to $$P_k = \delta \times \frac{OUT_k}{IN_k} \times \frac{IO}{N-1},$$

$P_k$ is a probability of the k th class.

$IN_k$ is the in-degree of the k th class and k is a natural number. $OUT_k$ is the out-degree of the k th class and k is a natural number.

IO is the number of pointed classes from the k th class.

N is the total class number of the classes.

δ is a weight coefficient.

For example, the example device may further include a modeling unit. The modeling unit uses the list page set to conduct model training to create a list page identification model.

For example, an example device may further include an identifying unit. The identification unit uses the list page identification model to identify a particular page, and, if the particular page is identified as a list page, adds the particular page into the list page set.

For example, an example device may further include an updating unit. The updating unit, according to updating information of each list page in the list page set, updates the list page set, adjusts an extracting frequency of each list page, or generates a page template.

For example, an page feature may include at least one of the following information: a layout feature of the page, a uniform resource locator of the page, and a content feature of the page.

The present techniques acquire one or more pages of a designated website, cluster the one or more pages to obtain one or more classes in accordance with page features of the pages, and select at least one class as a list page set according to a page linking relationship between the one or more classes. It is not necessary to require an operator to manually involve in the process of establishing the list page set. The present techniques have simple operations and high accuracy rate, thereby improving an efficiency and reliability of establishing a list page library.

In addition, the present techniques may obtain all of the current pages of the website and thus create the page list set based on all pages of the website, thereby improving a coverage rate of the list page.

In addition, the present techniques create the page identification model through the created page list set, automatically identify newly added pages of the website, thereby improving a coverage percentage and timeliness of the list pages.

In addition, the present techniques, through updating information of each list page in the created list page set, update the page list set in real time, thereby improving the timeliness of the list page set.

In addition, the present techniques, through updating information of each list page in the created list page set, adjust the extracting frequency of each list page, thereby improving an extraction successful rate of the list pages.

In addition, the present techniques, through updating information of each list page in the created list page set, generate the page template to automatically identify the newly added pages of the website or extract page contents of the website, thereby improving the coverage percentage and timeliness of the list pages or an extraction successful rate of the page contents.

BRIEF DESCRIPTION OF THE DRAWINGS

To more clearly describe the example embodiments of the present disclosure, the example embodiments and the accompanying drawings are briefly introduced. Apparently, the explained embodiments and the accompanying drawings are only part of the embodiments. One of ordinary skill in the art may obtain other embodiments or drawings based on the example embodiments and the accompanying drawings without using creative efforts.

DETAILED DESCRIPTION

The detailed of the present disclosure will be explained in the example embodiments by referring to the accompanied drawings in order to make the objectives, technical solutions, and advantages of the present disclosure more clear. The example embodiments described herein are only a part of instead of all embodiments of present disclosure. According to the example embodiments of the present disclosure, any other embodiments obtained by a person with an ordinary skill in the art without a creative effort should be included in the scope of the present disclosure.

It is noted that a terminal device of the present disclosure may include, but is not limit to, a cellular phone, a personal digital assistant, a wireless hand-held device, a wireless notebook, a personal computer, a portable computer, a PC, a MP3 player, a MP4 player, etc.

It is noted that a page involved in the present disclosure may be a page or a webpage of a website that is written based on HyperText Markup Language (HTML), Extensible HyperText Markup Language (XHTML), or Wireless Markup Language (WML).

In addition, a term "and/or" used in the present disclosure represents certain relationships between related objects, which may include three kinds of relationships. For example, a term "A and/or B" may be any one of the following situations including: only A, both A and B, and only B. Furthermore, a character "/" used in the present disclosure generally indicates a relationship of "or" between two related objects.

Figure 1:
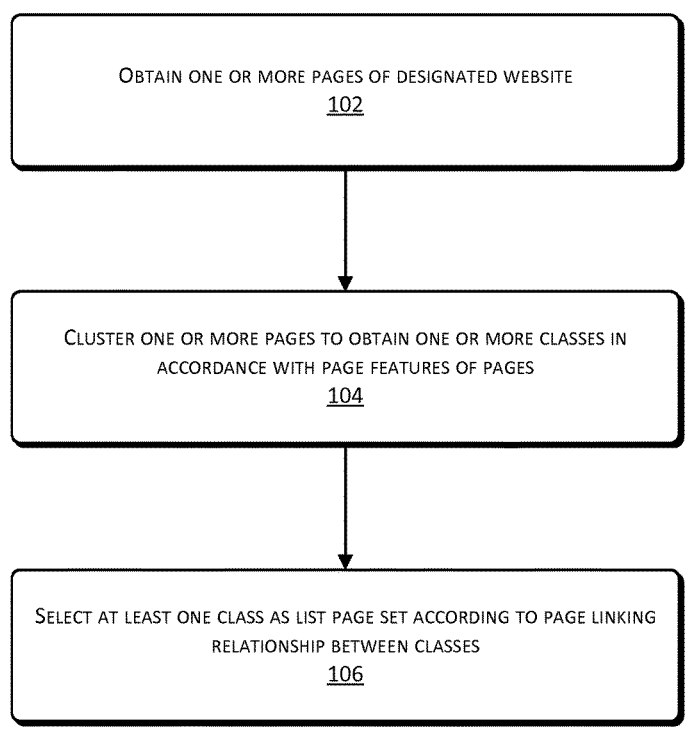
FIG. 1 is a flowchart of an example method for processing a page according to an example embodiment of the present disclosure.

FIG. 1 is a flowchart of an example method for processing page according to an example embodiment of the present disclosure.

At 102, one or more pages of a designated website are obtained.

At 104, the one or more pages are clustered to obtain one or more classes in accordance with page features of the pages. The page features may include, but are not limit to, at least one of the follow: a layout feature of a page; a uniform resource locator (URL) feature of the page, and a content feature of the page.

For example, the layout feature of the page may represent format information of a text, a graphic, or a table of the page, such as a font, a font size, a page margin, etc.

For example, the URL feature of the page may represent attribute information of the URL of the page, such as a keyword included in URL, a suffix of a URL, etc.

For example, the content feature of the page may represent content information of the page, such as a keyword, a symbol, etc. included in the content.

Optionally, in an example embodiment of the present disclosure, each page feature may be represented by a feature vector X, such as a feature vector $X_1$, a feature vector $X_2$ . . . , or a feature vector $X_n$, etc, wherein n is a natural number. The page features of each page may be combined as a feature matrix Z in a form of $[X_1\ X_2\ \ldots\ X_n]$.

For example, at 104, a distance between pages, i.e., a distance between feature matrixes of the pages, may be obtained according to the feature matrix of each page. Any general distance algorithm may be used, e.g., a Manhattan distance algorithm, a Euclidean distance algorithm, etc. Details of these algorithms may refer to related techniques, which are omitted herein. Thereafter, two pages are clustered according to a distance between the two pages and a predetermined threshold value of clustering. If the distance between the two pages is smaller than or equal to the threshold value of clustering, then both pages will be grouped within a same class. If the distance between two pages is larger than the threshold value of clustering, then these two pages will be placed into different classes. Therefore, the pages in the same class have the same feature matrix or have difference of their feature matrixes within in a predetermined threshold range. Each class corresponds to different feature matrix. The details may refer to Table 1 as example.

TABLE 1

Corresponding relationship between page features and classes

| Page feature of page | Class of page |
|---|---|
| Feature matrix 1 | Class 1 |
| Feature matrix 2 | Class 2 |
| Feature matrix 3 | Class 3 |
| Feature matrix 4 | Class 4 |
| Feature matrix 5 | Class 1 |
| Feature matrix 6 | Class 2 |
| Feature matrix 7 | Class 3 |
| Feature matrix 8 | Class 4 |
| Feature matrix 9 | Class 1 |
| Feature matrix 10 | Class 2 |
| Feature matrix 11 | Class 3 |
| Feature matrix 12 | Class 4 |
| . . . | . . . |
| Feature matrix s | Class t |

At 106, at least one class is selected as a list page set according to a page linking relationship between the one or more classes. For example, a list page may be a page including a classification list that contains multiple contents, such as a page that classifies and lists links to other pages of the website.

Generally, when a website is created, a system may automatically create a root node and create pages of the website starting from the root node.

For example, at 106, a probability of a respective page in a respective class of the website as the list page of the website is determined according to one or more other pages linked from the respective page and one or more other pages linked to the respective page. At least one class is then selected as the list page set according to the probability.

For example, the following detailed operations may be performed. An out-degree of a respective class is determined according to the other pages linked from each page in the respective class. An in-degree of the respective class is determined according to the other pages linked to each page in the respective class. A number of pointed classes from the respective class is determined. The respective class and each of the pointed class may satisfy that the out-degree of the respective class with respect to a respective pointed class is larger than the in-degree of the respective class with respect to the respective pointed class. The probability is determined according to the out-degree of the respective class, the in-degree of the respective class, and the number of pointed classes.

For example, it is understandable that all other pages linked from the pages in the respective class are pages not included in the respective class and all other pages linked to the pages in the respective class are pages not included in the respective class.

An out-degree of the respective class is a sum of an out-degree of each page in the respective class. The out-degree of the respective page is determined by a distance between the respective page and a root node of the website, other pages linked from the respective page, and a distance between the other pages linked from the respective page and the root node of the website.

An in-degree of the respective class is a sum of an in-degree of each page in the respective class. The in-degree of the respective page is determined by a distance between the respective page and a root node of the website, other pages linked to the respective page, and a distance between the other pages linked to the respective page and the root node of the website.

The distance between the page and the root node refers to a page depth that is obtained through traversing links of the page level by level from the root node. For example, a page depth of the root node is 1, and a page depth of a page pointed by a link contained in the page of the root node is 2.

With regard to the respective page, the in-degree represents a score of influence of other pages linked to the respective page to the respective page in the linking relationship.

The in-degree of the respective page is determined by the distance between the respective page and the root node of the website, other pages linked to the respective page, and a distance between the other pages linked to the respective page and the root node of the website.

The in-degree of the respective class may be obtained by comprehensive statistics of the in-degree of each page. For instance, the in-degree of the respective class may be a sum of an in-degree of each page in the respective class.

When calculating the in-degree of the respective class, for the purpose of illustration, pages in the respective class are used as target pages. Pages that are linked to the target pages, i.e., the pages whose hyperlinks point to the target pages, are the pages linked to the target pages. The page linked to the target pages, or linked-to pages, are pages that are not within the same class as the target pages.

When the depths of the linked-to pages of a respective target page are different, their influences to the in-degree of the respective target page are different.

$DI_i$ is an in-degree increment contributed by the i th linked-to page to the j th target page in the page linking relationship, and i is a natural number. If the distance between the j th target page and the root node of the website is larger than the distance between the i th linked-to page of the j th target page and the root node of the website, the in-degree increment contributed by the i th linked-to page to the j th target page is α, or $DI_i=\alpha$. If the distance between the j th target page and the root node of the website is smaller than the distance between the i th linked-to page of the j th target page and the root node of the website, $DI_i=\beta$, α>β, α+β=N, and N is a natural number. If the distance between the j th target page and the root node of the website is equal to the distance between the i th linked-to page of the j th target page and the root node of the website, $DI_i=\chi$, χ=N/2, and N is a natural number. The in-degree of the target page j is a sum of an in-degree increment of all linked-to pages as noted as $$\left(\sum_i DI_i\right)_j,$$

wherein i and j are natural numbers.

The in-degree of the respective class is a sum of an in-degrees of all target pages in the respective class, which is represented as obtained according to $$IN_k = \sum_j \left(\sum_i DI_i\right)_j.$$

Similarly, the out-degree of the respective class is obtained according to a distance between each respective page in the respective class and the root node of the website and a distance between other pages linked from the respective page and the root node of the website. The pages that are linked from the respective page are not included in the respective class of the respective page.

With regard to the respective page, the out-degree represents a score of influence of other pages linked from the respective page to the respective page in the page linking relationship.

The out-degree of the respective page is determined by the distance between the respective page and the root node of the website, other pages linked from the respective page, and a distance between the other pages linked from the respective page and the root node of the website.

The out-degree of the respective class may be obtained by comprehensive statistics of the out-degree of each page. For instance, the out-degree of the respective class may be a sum of an out-degree of each page in the respective class.

When calculating the out-degree of the respective class, for the purpose of illustration, pages in the respective class are used as target pages. Pages that are linked from the target pages, i.e., the pages whose are pointed by hyperlinks from the target pages, are the pages linked from the target pages. The pages linked from the target pages, or linked-out pages, are pages that are not within the same class as the target pages.

When the depths of the linked-out pages of a respective target page are different, their influences to the out-degree of the respective target page are different.

$DO_i$ is an out-degree increment contributed by an i th linked-out page to the j th target page in the page linking relationship, and i is a natural number. If a distance between the j th target page and the root node of the website is larger than a distance between the i th linked-out page of the j th target page and the root node of the website, the out-degree increment contributed by an i th linked-out page to the j th target page is α, or $DO_i=\alpha$. If the distance between the j th target page and the root node of the website is smaller than the distance between the i th linked-out page and the root node of the website, $DO_i=\beta$, α<β, α+β=N, and N is a natural number. If the distance between the j th target page and the root node of the website is equal to the distance between the i th linked-out page and the root node of the website, $DO_i=\chi$, χ=N/2, and N is a natural number.

The out-degree of a class is a sum of the out-degree of all target pages in the class, as noted as $$OUT_k = \sum_j \left(\sum_i DO_i\right)_j.$$

The in-degree of the respective class to another class may be obtained according to a distance between all pages of the respective class and the root node of the website, and a distance between pages in another class that point to the respective page in the respective class. The pages that point to the respective page of the respective class are included in another class.

For example, the method for obtaining the correlational in-degree of the respective class to another class may refer to the calculation formula of the in-degree of each class. The difference is that the in-degree of the respective class is calculated by a sum of the in-degree increments contributed by the respective class to another class. In other words, only the in-degree increments contributed by linked-in pages of the target pages of the respect class, which belong to another class, are counted.

The correlational out-degree of the respective class to another class may be obtained according to the distance between each page of the respective class and the root node of the website and the distance between pages in another class that are pointed by each page of the respective class and the root node of the website. The pages to which the respective page of the respective class is pointed are included in another class.

For example, the method for obtaining the correlational out-degree of the respective class to another class may refer to the calculation formula of the out-degree of each class. The difference is that the out-degree of the respective class is calculated by a sum of the out-degree increments contributed by the respective class to another class. In other words, only the out-degree increments contributed by linked-out pages of the target pages of the respect class, which belong to another class, are counted.

A pointing relationship between two classes may be determined according to a comparison between the correlational in-degree and the correlational out-degree of the respective class with respect to another class.

When the correlational out-degree of the respective class with respect to another class is larger than the correlational in-degree of the respective class with respect to another class, another class is the pointed class of the respective class. That is, in the pointing relationship between the respective class and another class, the respective class points to another class that is the pointed class.

According to the comparison between the correlational out-degree and correlational in-degree of the respective class to another class, a number of pointed classes of the respective class is calculated.

A probability that a respective page in the respective class is the list page of the website may be obtained according to the in-degree of the respective class, the out-degree of the respective class, a number of pointed classes of the respective class, and a total number of classes, which is noted as $P_k$.

For example, the probability of each class may be obtained according to $$P_k = \delta \times \frac{OUT_k}{IN_k} \times \frac{IO}{N-1},$$

wherein, $P_k$ is the probability of a k th class;

$IN_k$ is the in-degree of the k th class and k is a natural number;

$OUT_k$ is the out-degree of the k th class and k is a natural number;

IO is a number of pointed classes of the k th class;

N is a total number of the classes; and $\delta$ is a weight coefficient.

It is noted that the probability $P_k$ of the kth class may be any value larger than or equal to 0. The larger the value is, the higher the probability that the page is the list page is, and vice versa. For example, $\delta$ may be set according to the corresponding feature matrix of respective class or the distance between pages of the respective class and the root node. The example embodiment of the present disclosure does not impose any restriction. Finally, according to the probability of each class, at least one class is chosen as the list page set.

For example, one or more classes having the highest probabilities may be chosen as the list page set.

Optionally, in one example implementation, the feature matrix of each class may be further obtained according to feature matrix of all pages of each class. Further, the distance between classes may be determined according to distance between the feature matrix of each class. Then, two classes are merged according to the distance between the two classes and a predetermined threshold value. As there is pointing relationship between certain classes, the merged result may not destroy the relationship between the classes. Only the merge that does not destroy the pointing relationship between classes may be considered as an effective merge and is allowed to be performed. Otherwise, the merge is invalid and may not be performed.

Accordingly, the present techniques acquire the pages of the designated website, obtain one or more classes by clustering the pages in accordance with page features of the pages, and choose, according to the page linking relationship of the pages in the one or more classes, at least one class as the list page set. Under the present techniques, an operator is not necessarily involved to create the list page set. The present techniques have easy operations and high accuracy rate, thereby improving the performance and reliability of list page library creating.

In addition, the present techniques may obtain all pages of the website. Thus, the present techniques efficiently improve a coverage rate of the list page based on the list page set created from all pages of the website.

Optionally, in another example embodiment of the present disclosure, after step 106, the list page set is used to conduct model training to create a list page identification model.

Accordingly, the list page identification model may be used to identify pages. If an identifying result is the list page, the list page is added into the list page set. Thus, the present techniques create the page identification model through the created page list set, automatically identify newly added pages of the website, thereby improving a coverage percentage and timeliness of the list pages.

Optionally, in another example embodiment of the present disclosure, after step 106, the example method may further update the list page set according to update information of each list page in the list page set. Thus, the present techniques, through updating information of each list page in the created list page set, update the page list set in real time, thereby improving the timeliness of the list page set.

Optionally, in another example embodiment of the present disclosure, after step 106, the example method may further adjust an extracting frequency of each list page according to the update information of each list page in the list page set. Thus, the present techniques, through updating information of each list page in the created list page set, adjust the extracting frequency of each list page, thereby improving an extraction successful rate of the list pages.

Optionally, in another example embodiment of the present disclosure, after step 106, the example method may further generate a page template according to the update information of each list page in the list page set. Thus, the present techniques, through updating information of each list page in the created list page set, generates the page template to automatically identify the newly added pages of the website or extract page contents of the website, thereby improving the coverage percentage and timeliness of the list pages or an extraction successful rate of the page contents.

It is noted that, for the purpose of brevity, the above example method embodiments are described as a sequence of operations. However, one of skill in the art should understand that the present disclosure is not limited to the described sequence of steps or operations. According to the present disclosure, some steps or operations may be achieved by other sequence or performed simultaneously. In addition, one of ordinary skill in the art should also understand that not all of the operations and modules described herein are necessary in the present disclosure.

In the above example embodiments, the descriptions of each example embodiments have their own preferences. Some portions that are not detailed in one example embodiment may refer to relevant descriptions in another example embodiment.

Figure 2:
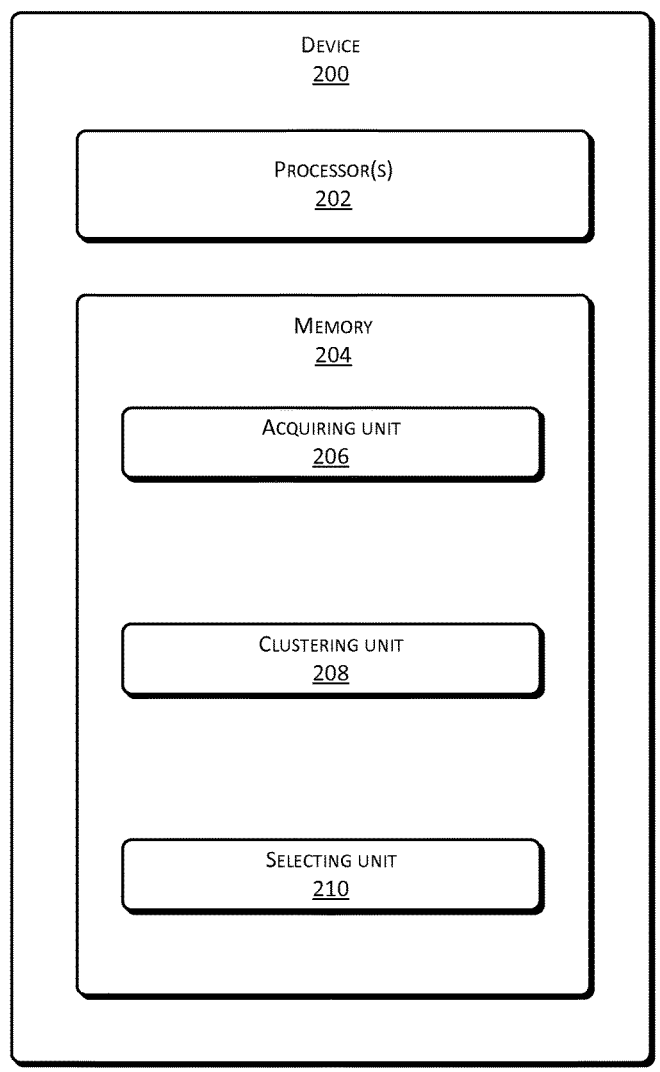
FIG. 2 is a diagram of an example device for processing a page according to another example embodiment of the present disclosure.

FIG. 2 illustrates a diagram of an example device 200 for processing page according to another example embodiment of the present disclosure. As shown in FIG. 2, the device 200 may include one or more processor(s) 202 or data processing unit(s) and memory 204. The memory 204 is an example of computer-readable media. The memory 204 may store therein a plurality of modules including an acquiring unit 206, a clustering unit 208, and a selecting unit 210. The acquiring unit 206 acquires one or more pages of a designated website. The clustering unit 208 clusters the one or more pages to obtain one or more classes in accordance with page features of the pages. The selecting unit 210 selects at least one class as a list page set according to a page linking relationship between the one or more classes.

For example, the page feature may include, but is not limited to, at least one of the following information: a layout feature of the page, a uniform resource locator of the page, and a content feature of the page.

For example, the layout feature of the page may represent format information of a text, a graphic, or a table of the page, such as a font, a font size, a page margin, etc.

For example, the URL feature of the page may represent attribute information of the URL of the page, such as a keyword included in URL, a suffix of a URL, etc.

For example, the content feature of the page may represent content information of the page, such as a keyword, a symbol, etc. included in the content.

Optionally, in an example embodiment of the present disclosure, each page feature may be represented by a feature vector X, such as a feature vector $X_1$, a feature vector $X_2$ ..., or a feature vector $X_n$, etc, wherein n is a natural number. The page features of each page may be combined as a feature matrix Z in a form of $[X_1\ X_2\ \ldots\ X_n]$.

For example, the clustering unit 208 may obtain a distance between pages, i.e., a distance between feature matrixes of the pages, according to the feature matrix of each page. Any general distance algorithm may be used, e.g., a Manhattan distance algorithm, a Euclidean distance algorithm, etc. Details of these algorithms may refer to related technical contents, which are omitted herein. Thereafter, the clustering unit 208 clusters two pages according to a distance between the two pages and a predetermined threshold value of clustering. If the distance between the two pages is smaller than or equal to the threshold value of clustering, the clustering unit 208 places both pages within a same class. If the distance between two pages is larger than the threshold value of clustering, the clustering unit 208 places these two pages in different classes. Therefore, the pages in the same class have the same feature matrix or have difference of their feature matrixes within in a predetermined threshold range. Each class corresponds to different feature matrix. The details may refer to Table 1 as example.

For example, the list page may be a page including a classification list that contains multiple contents, such as a page that classifies and lists links to other pages of the website.

Generally, when a website is created, a system may automatically create a root node and create pages of the website starting from the root node.

For example, the selecting unit 210 determines a probability of a respective page in a respective class of the website as the list page of the website is determined according to one or more other pages linked from the respective page and one or more other pages linked to the respective page. At least one class is then selected as the list page set according to the probability.

For example, the selecting unit 210 may perform the following detailed operations. The selecting unit 210 determines an out-degree of a respective class according to the other pages linked from each page in the respective class, determines an in-degree of the respective class according to the other pages linked to each page in the respective class, and determines a number of pointed classes from the respective class. The respective class and each of the pointed class may satisfy that the out-degree from the respective class to a respective pointed class is larger than the in-degree from the respective class to the respective pointed class. The probability is determined according to the out-degree of the respective class, the in-degree of the respective class, and the number of pointed classes.

For example, it is understandable that all other pages linked from the pages in the respective class are not included in such class and all other pages linked to the pages in the respective class are not included in such class.

An out-degree of the respective class is a sum of an out-degree of each page in the respective class. The out-degree of the respective page is determined by a distance between the respective page and a root node of the website, other pages linked from the respective page, and a distance between the other pages linked from the respective page and the root node of the website.

An in-degree of the respective class is a sum of an in-degree of each page in the respective class. The in-degree of the respective page is determined by a distance between the respective page and a root node of the website, other pages linked to the respective page, and a distance between the other pages linked to the respective page and the root node of the website.

The distance between the page and the root node refers to a page depth that is obtained through traversing links of the page level by level from the root node. For example, a page depth of the root node is 1, and a page depth of a page pointed by a link contained in the page of the root node is 2.

With regard to the respective page, the in-degree represents a score of influence of other pages linked to the respective page to the respective page in the linking relationship.

The in-degree of the respective page is determined by the distance between the respective page and the root node of the website, other pages linked to the respective page, and a distance between the other pages linked to the respective page and the root node of the website.

The in-degree of the respective class may be obtained by comprehensive statistics of the in-degree of each page. For instance, the in-degree of the respective class may be a sum of an in-degree of each page in the respective class.

When the calculating unit 210 calculates the in-degree of the respective class, for the purpose of illustration, pages in the respective class are used as target pages. Pages that are linked to the target pages, i.e., the pages whose hyperlinks point to the target pages, are the pages linked to the target pages. The page linked to the target pages, or linked-to pages, are pages that are not within the same class as the target pages.

When the depths of the linked-to pages of a respective target page are different, their influences to the in-degree of the respective target page are different.

$DI_i$ is an in-degree increment contributed by the i th linked-to page to the j th target page in the page linking relationship, and i is a natural number. If the distance between the j th target page and the root node of the website is larger than the distance between the i th linked-to page of the j th target page and the root node of the website, the in-degree increment contributed by the i th linked-to page to the j th target page is α, or $DI_i=α$. If the distance between the j th target page and the root node of the website is smaller than the distance between the i th linked-to page of the j th target page and the root node of the website, $DI_i=β$, $α>β$, $α+β=N$, and N is a natural number. If the distance between the j th target page and the root node of the website is equal to the distance between the i th linked-to page of the j th target page and the root node of the website, $DI_i=χ$, $χ=N/2$, and N is a natural number. The in-degree of the target page j is a sum of the in-degree increment of all linked-to pages as noted as $$\left(\sum_i DI_i\right)_j,$$

wherein i and j are natural numbers.

The in-degree of the respective class is a sum of an in-degrees of all target pages in the respective class, which is represented as obtained according to $$IN_k = \sum_j \left(\sum_i DI_i\right)_j.$$

Similarly, the selecting unit 210 may obtain the out-degree of the respective class according to a distance between each respective page in the respective class and the root node of the website and a distance between other pages linked from the respective page and the root node of the website. The pages that are linked from the respective page are not included in the respective class of the respective page.

With regard to the respective page, the out-degree represents a score of influence of other pages linked from the respective page to the respective page in the linking relationship.

The out-degree of the respective page is determined by the distance between the respective page and the root node of the website, other pages linked from the respective page, and a distance between the other pages linked from the respective page and the root node of the website.

The out-degree of the respective class may be obtained by comprehensive statistics of the out-degree of each page. For instance, the out-degree of the respective class may be a sum of an out-degree of each page in the respective class.

When the calculating unit 210 calculates the out-degree of the respective class, for the purpose of illustration, pages in the respective class are used as target pages. Pages that are linked from the target pages, i.e., the pages whose are pointed by hyperlinks from the target pages, are the pages linked from the target pages. The pages linked from the target pages, or linked-out pages, are pages that are not within the same class as the target pages.

When the depths of the linked-out pages of a respective target page are different, their influences to the out-degree of the respective target page are different.

$DO_i$ is an out-degree increment contributed by an i th linked-out page to the j th target page in the page linking relationship, and i is a natural number. If a distance between the j th target page and the root node of the website is larger than a distance between the i th linked-out page of the j th target page and the root node of the website, the out-degree increment contributed by an i th linked-out page to the j th target page is α, or $DO_i=α$. If the distance between the j th target page and the root node of the website is smaller than the distance between the i th linked-out page and the root node of the website, $DO_i=β$, $α<β$, $α+β=N$, and N is a natural number. If the distance between the j th target page and the root node of the website is equal to the distance between the i th linked-out page and the root node of the website, $DO_i=χ$, $χ=N/2$, and N is a natural number.

The out-degree of a class is a sum of the out-degree of all target pages in the class, as noted as $$OUT_k = \sum_j \left(\sum_i DO_i\right)_j.$$

The selecting unit 210 may obtain the correlational in-degree of the respective class with respect to another class according to a distance between all pages of the respective class and the root node of the website, and a distance between pages in another class that point to the respective page in the respective class. The pages that point to the respective page of the respective class are included in another class.

For example, the method for obtaining the correlational in-degree of the respective class with respect to another class may refer to the calculation formula of the in-degree of each class. The difference is that the in-degree of the respective class is calculated by a sum of the in-degree increments contributed by the respective class to another class. In other words, only the in-degree increments contributed by linked-in pages of the target pages of the respect class, which belong to another class, are counted.

The selecting unit 210 may obtain the correlational out-degree of the respective class to another class according to the distance between each page of the respective class and the root node of the website and the distance between pages in another class that are pointed by each page of the respective class and the root node of the website. The pages to which the respective page of the respective class is pointed are included in another class.

For example, the method for obtaining the correlational out-degree of the respective class to another class may refer to the calculation formula of the out-degree of each class. The difference is that the out-degree of the respective class is calculated by a sum of the out-degree increments contributed by the respective class to another class. In other words, only the out-degree increments contributed by linked-out pages of the target pages of the respect class, which belong to another class, are counted.

The selecting unit 210 may determine a pointing relationship between two classes according to a comparison between the correlational in-degree and the correlational out-degree of the respective class to another class.

When the correlational out-degree of the respective class with respect to another class is larger than the correlational in-degree of the respective class to another class, another class is the pointed class of the respective class. That is, in the pointing relationship between the respective class and another class, the respective class points to another class that is the pointed class.

The selecting unit 210, according to the comparison between the correlational out-degree and correlational in-degree of the respective class to another class, calculates a number of pointed classes of the respective class.

For example, the selecting unit 210 may obtain a probability that a respective page in the respective class is the list page of the website according to the in-degree of the respective class, the out-degree of the respective class, a number of pointed classes of the respective class, and a total number of classes, which is noted as $P_k$.

For example, the probability of each class may be obtained according to $$P_k = \delta \times \frac{OUT_k}{IN_k} \times \frac{IO}{N-1},$$

wherein, $P_k$ is the probability of a k th class;

$IN_k$ is the in-degree of the k th class and k is a natural number;

$OUT_k$ is the out-degree of the k th class and k is a natural number;

IO is a number of pointed classes of the k th class;

N is a total number of classes; and $\delta$ is a weight coefficient.

It is noted that the probability $P_k$ of the kth class may be any value larger than or equal to 0. The larger the value is, the higher the probability that the page is the list page is, and vice versa. For example, $\delta$ may be set according to the corresponding feature matrix of respective class or the distance between pages of the respective class and the root node. The example embodiment of the present disclosure does not impose any restriction. Finally, according to the probability of each class, at least one class is chosen as the list page set.

For example, one or more classes having the highest probabilities may be chosen as the list page set.

Optionally, in one example implementation, the clustering unit 210 may obtain the feature matrix of each class according to feature matrix of all pages of each class. Further, the distance between classes may be determined according to distance between the feature matrix of each class. Then, two classes are merged according to the distance between the two classes and a predetermined threshold value. It is noted that the merged result may not destroy the pointing relationship between the classes as there is pointing relationship between certain classes. Only the merge that does not destroy the pointing relationship between classes may be considered as an effective merge and is allowed to be performed. Otherwise, the merge is invalid and may not be performed.

Accordingly, the acquiring unit 206 acquires the pages of the designated website. The clustering unit 208 further obtains one or more classes by clustering the pages in accordance with page features of the pages. So that the selecting unit 210 chooses, according to the page linking relationship of the pages in the one or more classes, at least one class as the list page set. Under the present techniques, an operator is not necessarily involved to create the list page set. The present techniques have easy operations and high accuracy rate, thereby improving the performance and reliability of list page library creating.

In addition, the present techniques may obtain all pages of the website. Thus, the present techniques efficiently improve a coverage rate of the list page based on the list page set created from all pages of the website.

Figure 3:
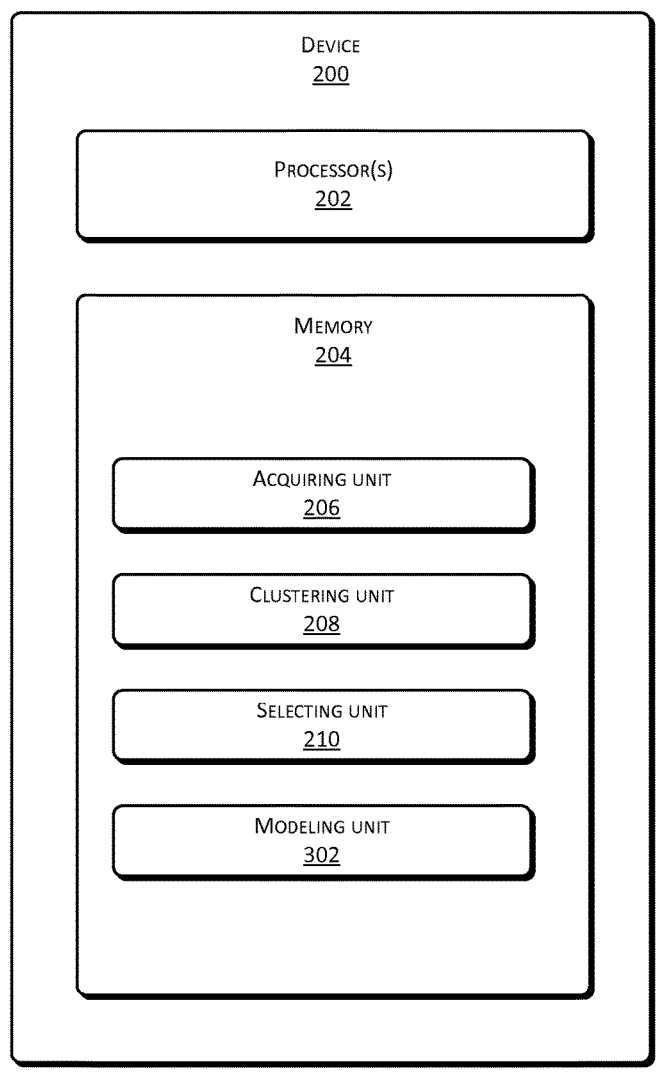
FIG. 3 is a diagram of another example device for processing a page according to another example embodiment of the present disclosure.

Optionally, in another example embodiment of the present disclosure, as shown in FIG. 3, the example device 200 may further include a modeling 302 stored in the memory 206. The modeling unit 302 uses the list page set to conduct model training to create a list page identification model.

Figure 4:
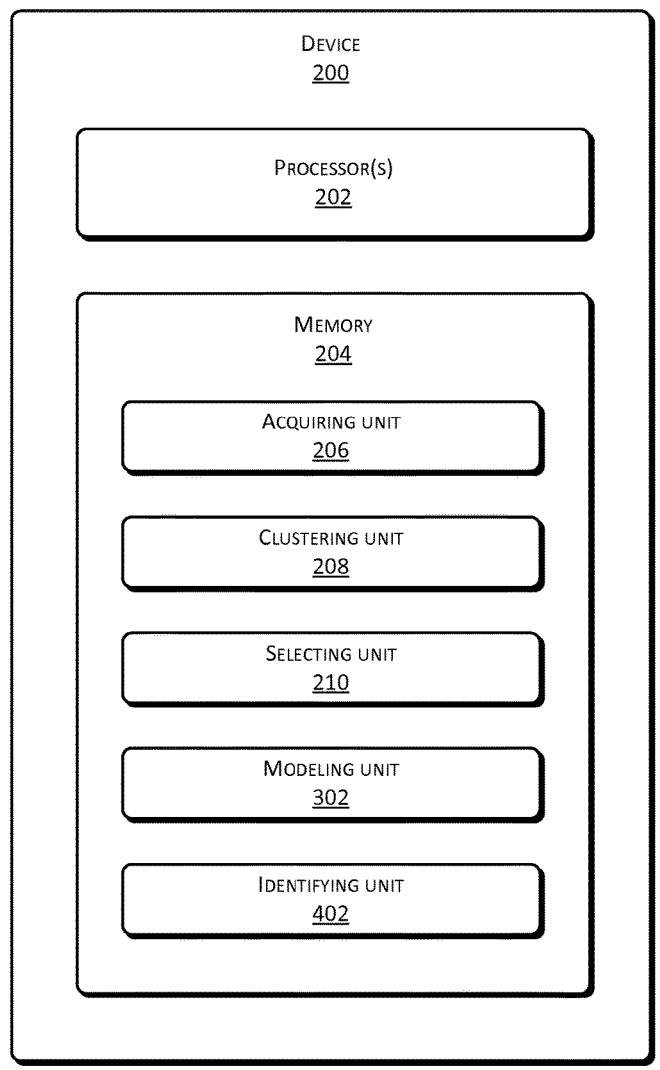
FIG. 4 is a diagram of another example device for processing a page according to another example embodiment of the present disclosure.

Optionally, in another example embodiment of the present disclosure, as shown in FIG. 4, the example device 200 may further include the modeling unit 302 and an identifying unit 402 stored in the memory 206. The identifying unit uses the list page identification model to identify pages. If an identifying result is the list page, the identifying unit 402 adds the list page into the list page set.

Thus, the present techniques create the page identification model through the page list set created by the modeling unit 302, automatically identify newly added pages of the website through the identifying unit 402, thereby improving a coverage percentage and timeliness of the list pages.

Figure 5:
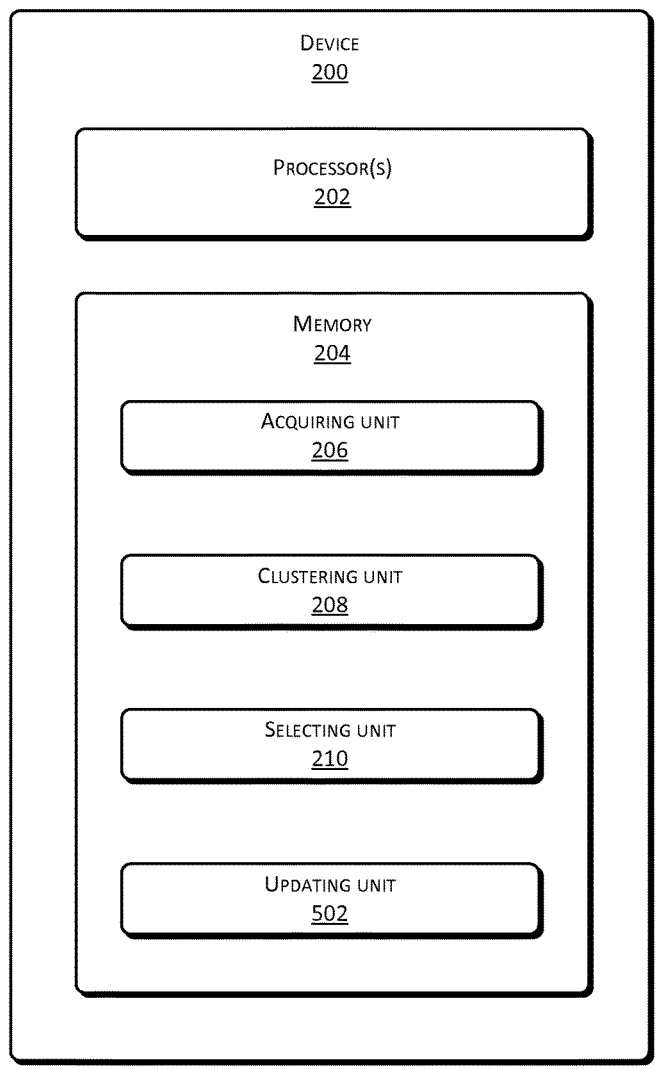
FIG. 5 is a diagram of another example device for processing a page according to another example embodiment of the present disclosure.

Optionally, in another example embodiment of the present disclosure, as shown in FIG. 5, the device 200 may further include an updating unit 502 stored in the memory 206. The updating unit 502, according to update information of each list page in the list page set, updates the list page set, adjusts an extraction frequency of each list page, or generates a page template.

Thus, the present techniques, through updating information of each list page in the created list page set, update the page list set in real time, thereby improving the timeliness of the list page set. Alternatively, the present techniques, through updating information of each list page in the created list page set, adjust the extracting frequency of each list page, thereby improving an extraction successful rate of the list pages. Alternatively, the present techniques, through updating information of each list page in the created list page set, generate the page template to automatically identify the newly added pages of the website or extract page contents of the website, thereby improving the coverage percentage and timeliness of the list pages or an extraction successful rate of the page contents.

In the example embodiments, the acquiring unit 206 acquires one or more pages of a designated website. Further the clustering unit 208 clusters the one or more pages to obtain one or more classes in accordance with page features of the pages. The selecting unit 210 selects at least one class as a list page set according to a page linking relationship between the one or more classes. It is not necessary to require an operator to manually involve in the process of establishing the list page set. The present techniques have simple operations and high accuracy rate, thereby improving an efficiency and reliability of establishing a list page library.

In addition, the present techniques may obtain all of the current pages of the website and thus create the page list set based on all pages of the website, thereby effectively improving a coverage rate of the list page.

In addition, the present techniques create the page identification model through the created page list set, automatically identify newly added pages of the website, thereby improving a coverage percentage and timeliness of the list pages.

In addition, the present techniques, through updating information of each list page in the created list page set, update the page list set in real time, thereby improving the timeliness of the list page set.

In addition, the present techniques, through updating information of each list page in the created list page set, adjust the extracting frequency of each list page, thereby improving an extraction successful rate of the list pages.

In addition, the present techniques, through updating information of each list page in the created list page set, generates the page template to automatically identify the newly added pages of the website or extract page contents of the website, thereby improving the coverage percentage and timeliness of the list pages or an extraction successful rate of the page contents.

One of ordinary skill in the art may understand the detailed operations of the above described systems, devices, and units may refer to the corresponding operations in the example method embodiments. For the purpose of brevity, the details are not described herein.

In the example embodiments of the present disclosure, it is noted that the disclosed system, device and method may be achieved by other manners. For example, the devices described in the above example embodiments are merely examples. For example, the divided units may be just classifications of logic functions. There may be other dividing manners in practical implementation. For example, multiple units or components may be combined or integrated into another system. For another example, some characteristics may be omitted or not performed. In addition, the inter-coupling, the direct coupling, or the communicating connection may be achieved through some interfaces. The non-direct coupling between devices or units may be in a form of electricity, mechanics, or any other form.

A unit described as a separate component may or may not be physically separate. A component displayed as a unit may or may not be a physical unit, which may be located in a place or be distributed among multiple units. The object of the present disclosure may be achieved by choosing some or all units according to the practical requirement.

In addition, all functional units in the embodiments of the present disclosure may be integrated into a processing unit, or physically separate units. Two or more units may be integrated into one unit. The integrated unit may be implemented in form of hardware, software, or a combination of hardware and software function units.

The integrated unit in the form of software function units may be stored in the computer-readable media. The software function units stored in the computer-readable media may include computer-readable instruction that instruct a computing device (such as a personal computer, a server, a network device, or a processor) to perform some operations described in the example embodiments of the present disclosure. The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

One of ordinary skill in the art would understand that the above example embodiments are merely to illustrate the present disclosure without limiting the present disclosure. Although the above example embodiments of the present disclosure have been described in detail, one of ordinary skills in the art may modify the technical solution of the present techniques or make equivalent change of some technical features of the present techniques without departing from the principle and range of the present techniques. Such modification or change still fall under the protection of the present disclosure.

What is claimed is:

1. A method comprising:
    acquiring one or more pages of a website;
    clustering the one or more pages to obtain one or more classes according to one or more page features of the one or more pages;
    calculating a probability of a respective class as a list page set of the website based at least in part on a weighted product of a total number of pointed classes of the respective class and a ratio of an out-degree to an in-degree of the respective class;
    selecting at least one class as the list page set based on the probabilities of the classes;
    generating a page template for a list page in the list page set according to update information of each list page in the list page set, the update information of the list page including at least one of:
        a layout feature of the list page,
        a uniform resource locator of the list page, or
        a content feature of the list page;
    automatically identifying newly added pages of the website or automatically extracting page contents of the website based on the page template;
    adjusting an extracting frequency of each list page in the list page set according to the update information of each list page in the list page set; and
    updating the list page set in real time according to the update information of each list page in the list page set.

2. The method of claim 1, wherein the calculating the probability of the respective class as the list page set of the website according to one or more other pages linked from a respective page and one or more other pages linked to the respective page comprises:
    determining the out-degree of the respective class based on one or more pages linked from the respective page in the respective class;
    determining the in-degree of the respective class based on one or more pages linked to the respective page in the respective class; and
    determining the number of pointed classes that are pointed by the respective class, the respective class and the respective pointed class satisfying a condition that a correlational out-degree of the respective class with respect to the respective pointed class is larger than a correlational in-degree of the respective class with respect to the respective pointed class.

3. The method of claim 2, wherein:
    the out-degree of the respective class is a sum of an out-degree of each page in the respective class, a respective out-degree of the respective page being determined according to a distance between the respective page and a root node of the website, the one or more pages linked from the respective page, and a distance between the one or more pages linked from the respective page and the root node of the website; and the in-degree of the respective class is a sum of an in-degree of each page in the respective class, a respective in-degree of the respective page being determined according to the distance between the respective page and the root node of the website, the one or more pages linked to the respective page, and a distance between the one or more pages linked to the respective page and the root node of the website.

4. The method of claim 3, wherein the out-degree of the respective class is calculated according to $$OUT_k = \sum_j \left( \sum_i DO_i \right)_j,$$

wherein:
$OUT_k$ represents an out-degree of a k th class;

$$\left( \sum_i DO_i \right)_j$$

represents an out-degree of a j th page in the k th class;
$DO_i$ represents an out-degree increment contributed by an i th page pointed by the j th page in the page linking relationship;
if a distance between the j th page and the root node of the website is larger than a distance between the i th page and the root node of the website, $DO_i=\alpha_1$;
if the distance between the j th page and the root node of the website is smaller than the distance between the i th page and the root node of the website, $DO_i=\beta_1$, wherein $\alpha_1<\beta_1, \alpha_1+\beta_1=N$, and N represents a total number of classes and is a natural number; and
if the distance between the j th page and the root node of the website is equal to the distance between the i th page and the root node of the website, $DO_i=\chi$, wherein $\chi=N/2$.

5. The method of claim 4, wherein the in-degree of the respective class is calculated according to $$IN_k = \sum_j \left( \sum_i DI_i \right)_j,$$

wherein
$IN_k$ represents an in-degree of the k th class;

$$\left( \sum_i DI_i \right)_j$$

represents an in-degree of a j th page in the k th class;
$DI_i$ represents an in-degree increment contributed by an i th page that points to the j th page in the page linking relationship;
if a distance between the j th page and the root node of the website is larger than a distance between the i th page and the root node of the website, $DI_i=\alpha_2$;
if the distance between the j th page and the root node of the website is smaller than the distance between the i th page and the root node of the website, $DI_i=\beta_2$, wherein $\alpha_2>\beta_2, \alpha_2+\beta_2=N$; and
if the distance between the j th page and the root node of the website is equal to the distance between the i th page and the root node of the website, $DI_i=\chi$, wherein $\chi=N/2$.

6. The method of claim 5, wherein the probability of the respective class as the list page set of the website is calculated according to $$P_k = \delta \times \frac{OUT_k}{IN_k} \times \frac{IO}{N-1},$$

wherein
$P_k$ represents the probability of the k th class,
IO represents a total number of pointed classes of the k th class, and
$\delta$ is a weight coefficient.

7. The method of claim 1, further comprising using the list page set to conduct model training to create a list page recognition model.

8. The method of claim 7, further comprising:
using the list page recognition model to identify a page as a list page; and
adding the page to the list page set.

9. The method of claim 1, wherein the one or more page features include at least one of following information:
a layout feature of a respective page;
a uniform resource locator of the respective page; and
a content feature of the respective page.

10. A device comprising:
one or more processors; and
memory communicatively coupled to the one or more processors, the memory storing a plurality of units executable by the one or more processors,
wherein the one or more processors are configured to:
via an acquiring unit, acquire one or more pages of a website;
via a clustering unit, cluster the one or more pages to obtain one or more classes according to one or more page features of the one or more pages;
via a selecting unit, select at least one class as a list page set according to a page linking relationship between the one or more classes, the paging linking relationship based on a probability of a respective class as the list page set of the website based at least in part on a weighted product of a total number of pointed classes of the respective class and a ratio of an out-degree to an in-degree of the respective class; and
via an updating unit,
generate a page template for a list page in the list page set according to update information of each list page in the list page set, the update information of the list page including at least one of:
a layout feature of the list page,
a uniform resource locator of the list page, or
a content feature of the list page,
automatically identify newly added gapes of the website or automatically extract gape contents of the website based on the gape template;
adjust an extraction frequency of each list page using the page template, and update the list page set in real time using the page template.

11. The device of claim 10, wherein the one or processors are further configured to, via the selecting unit:
   determine the out-degree of the respective class based on one or more pages linked from the respective page in the respective class;
   determine the in-degree of the respective class based on one or more pages linked to the respective page in the respective class;
   determine the number of pointed classes that are pointed by the respective class, the respective class and the respective pointed class satisfying a condition that a correlational out-degree of the respective class with respect to the respective pointed class is larger than a correlational in-degree of the respective class with respect to the respective pointed class; and
   determine a probability of the respective class as the list page set of the website according to the out-degree of the respective class, the in-degree of the respective class, and the number of pointed classes,
   wherein:
   the out-degree of the respective class is a sum of an out-degree of each page in the respective class, a respective out-degree of the respective page being determined according to a distance between the respective page and a root node of the website, the one or more pages linked from the respective page, and a distance between the one or more pages linked from the respective page and the root node of the website; and
   the in-degree of the respective class is a sum of an in-degree of each page in the respective class, a respective in-degree of the respective page being determined according to a distance between the respective page and the root node of the website, the one or more pages linked to the respective page, and a distance between the one or more pages linked to the respective page and the root node of the website.

12. The device of claim 11,
   wherein the out-degree of the respective class is calculated according to $$OUT_k = \sum_j \left( \sum_i DO_i \right)_j,$$

wherein:

$$\left( \sum_i DO_i \right)_j$$

represents an out-degree of a j th page in the k th class;
   $DO_i$ represents an out-degree increment contributed by an i th page pointed by the j th page in the page linking relationship;
   if a distance between the j th page and the root node of the website is larger than a distance between the i th page and the root node of the website, $DO_i = a\alpha_1$;
   if the distance between the j th page and the root node of the website is smaller than the distance between the i th page and the root node of the website, $DO_i = \beta_1$, wherein $\alpha_1 < \beta_1, \alpha_1 + \beta_1 = N$, N represents a total number of classes and is a natural number; and
   if the distance between the j th page and the root node of the website is equal to the distance between the i th page and the root node of the website, $DO_i = \chi$, wherein $\chi = N/2$ and
   wherein the in-degree of the respective class is calculated according to $$IN_k = \sum_j \left( \sum_i DI_i \right)_j,$$

wherein $$\left( \sum_i DI_i \right)_j$$

represents an in-degree of a j th page in the k th class;
   $DI_i$ represents an in-degree increment contributed by an i th page that points to the j th page in the page linking relationship;
   if a distance between the j th page and the root node of the website is larger than a distance between the i th page and the root node of the website, $DI_i = \alpha_2$;
   if the distance between the j th page and the root node of the website is smaller than the distance between the i th page and the root node of the website, $DI_i = \beta_2$, wherein $\alpha_2 > \beta_2, \alpha_2 + \beta_2 = N$; and
   if the distance between the j th page and the root node of the website is equal to the distance between the i th page and the root node of the website, $DI_i = \chi$, wherein $\chi = N/2$.

13. The device of claim 12, wherein the probability of the respective class as the list page set of the website is calculated according to $$P_k = \delta \times \frac{OUT_k}{IN_k} \times \frac{IO}{N-1},$$

wherein
   $P_k$ represents the probability of the k th class,
   IO represents a total number of pointed classes of the k th class, and
   $\delta$ is a weight coefficient.

14. The device of claim 10, wherein the one or more processors are further configured to, via a modeling unit, use the list page set to conduct model training to create a list page recognition model.

15. The device of claim 14, wherein the one or more processors are further configured to, via an identifying unit, use the list page recognition model to identify a page as a list page and adds the page to the list page set.

16. The device of claim 10, wherein the one or more page features include at least one of following information:
   a layout feature of a respective page;
   a uniform resource locator of the respective page; and
   a content feature of the respective page.

17. One or more memories stored thereon computer-executable instructions executable by one or more processors to perform operations comprising:
   acquiring one or more pages of a website;
   clustering the one or more pages to obtain one or more classes according to one or more page features of the one or more pages;

calculating a probability of a respective class as a list page set of the website according to $$P_k = \delta \times \frac{\text{OUT}_k}{\text{IN}_k} \times \frac{IO}{N-1},$$

wherein:
$P_k$ represents a probability of a k th class,
$\text{IN}_k$ represents an in-degree of the k th class,
$\text{OUT}_k$ represents an out-degree of the k th class,
IO represents a total number of pointed classes of the k th class,
N represents a total number of classes and is a natural number, and
$\delta$ is a weight coefficient;
selecting at least one class as the list page set based on the probabilities of the classes;
generating a page template for a list page in the list page set according to update information of each list page in the list page set, the update information of the list page including at least one of:
    a layout feature of the list page,
    a uniform resource locator of the list page, or
    a content feature of the list page,
automatically identifying newly added pages of the website or automatically extracting page contents of the website based on the page template;
adjusting an extraction frequency of each list page using the page template; and
updating the list page set in real time according to the update information of each list page in the list page set.

18. The one or more memories of claim 17, wherein the one or more page features include at least one of following information:
    a layout feature of a respective page;
    a uniform resource locator of the respective page; and
    a content feature of the respective page.

19. The one or more memories of claim 17, wherein the operations further comprise:
    using the list page set to conduct model training to create a list page recognition model.

20. The one or more memories of claim 19, wherein the operations further comprise:
    using the list page recognition model to identify a page as a list page; and
    adding the page to the list page set.

* * * * *